UNITED STATES PATENT OFFICE.

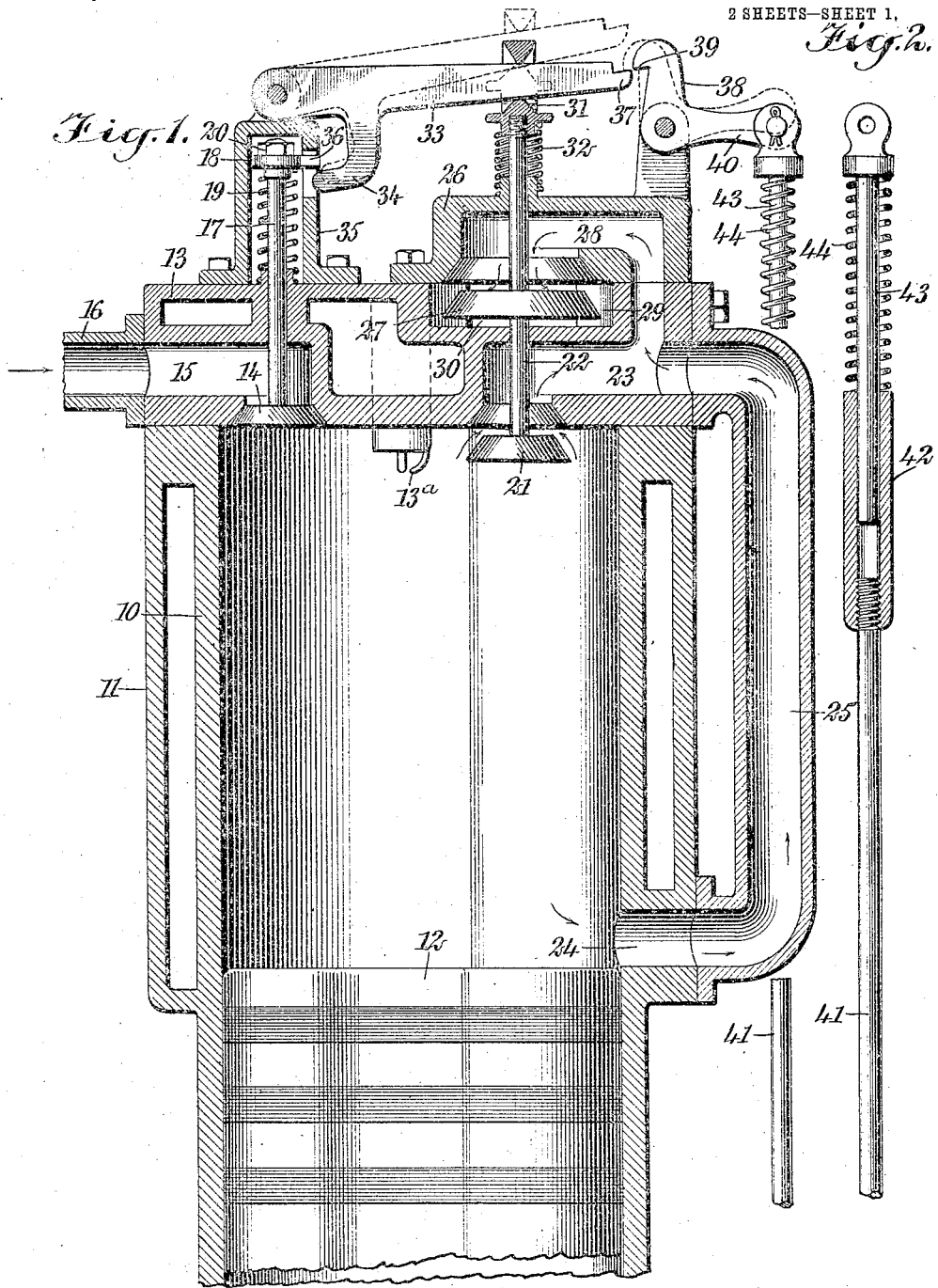

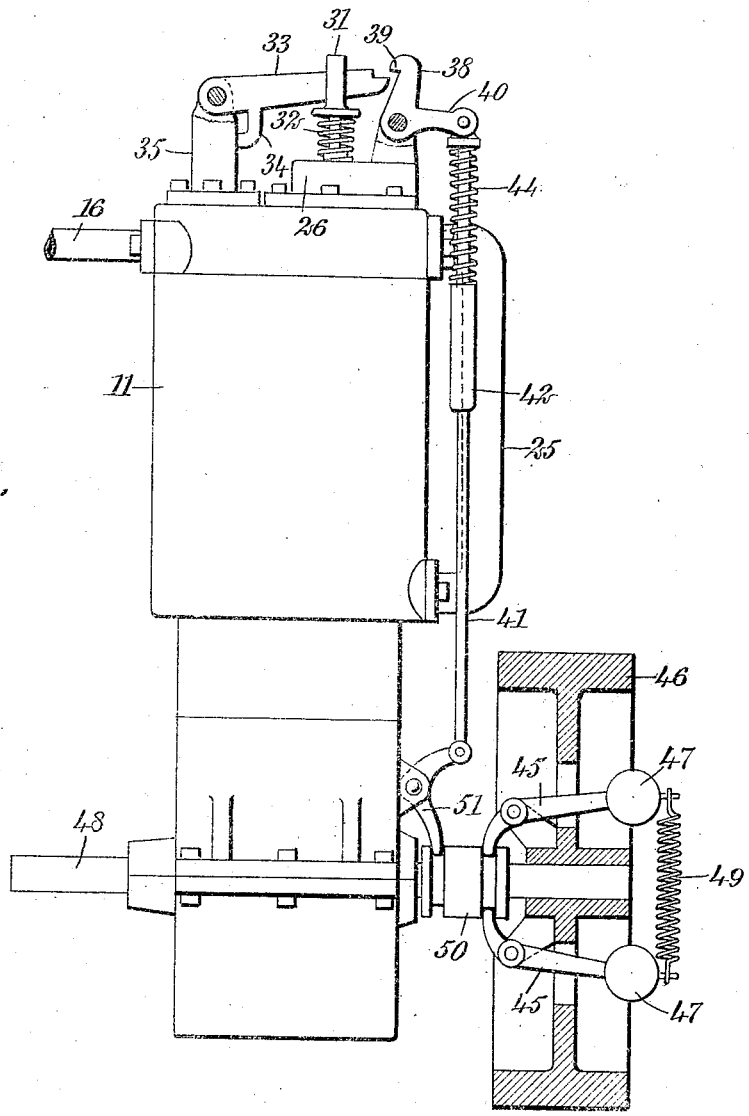

WILLIAM L. WAYRYNEN, OF DOLPH, SOUTH DAKOTA.

VALVE MECHANISM FOR ENGINES.

No. 898,807.      Specification of Letters Patent.      Patented Sept. 15, 1908.

Application filed June 25, 1907. Serial No. 380,762.

*To all whom it may concern:*

Be it known that I, WILLIAM L. WAYRYNEN, a citizen of the United States, and a resident of Dolph, in the county of Hamlin and State of South Dakota, have invented a new and Improved Valve Mechanism for Engines, of which the following is a full, clear, and exact description.

This invention relates to certain improvements in valve mechanism for engines, and is especially adapted for internal combustion engines.

The object of the invention is to provide means whereby the exhaust valve is automatically opened at the end of the exhaust stroke and held open by the escaping gas while the piston is completing its exhaust stroke.

A further object of the invention is to provide means whereby the inlet valve is positively prevented from opening while the exhaust valve is open, and to provide means for controlling the speed of the engine by holding the exhaust valve open and the inlet valve closed when the engine attains too high a speed.

The invention consists in certain features of construction and combinations of parts, all of which will be fully set forth hereinafter and particularly pointed out in the claims.

Reference is to be had to the accompanying drawings, forming a part of this specification, in which similar characters of reference indicate corresponding parts in both the figures, and in which Figure 1 is a longitudinal section through a portion of an engine provided with valve mechanism constructed in accordance with my improved invention; Fig. 2 is a side elevation of the governor rod; and Fig. 3 is a side elevation of the complete engine.

My improved valve mechanism is adapted for use in connection with any form of engine, but is more particularly adapted for use in connection with internal combustion engines. In the accompanying drawings I have illustrated an engine having a cylinder 10 provided with a water jacket 11, and having a piston 12 operating within the cylinder.
A cylinder head 13 closes the outer end of the cylinder and is provided with the inlet and exhaust ports and valves, whereby the flow of the motive fluid may be controlled. The cylinder head is preferably hollow, and the space therein and surrounding the inlet and exhaust ports may communicate with the space surrounding the body of the cylinder, whereby the water circulating in the jacket may also circulate through the cylinder head. An inlet valve 14 fits within the inlet port in the end of the cylinder, and this port constitutes the end of the inlet passage 15, which latter receives the explosive mixture through a supply pipe 16. The inlet valve 14 is carried by a valve stem 17 extending out through the end of the cylinder wall and having a head 18 forming a stop for a coil spring 19 encircling the valve rod. The spring tends to hold the valve in its closed position, but readily permits the opening of the valve by the suction pressure within the cylinder at the time the piston starts on the suction stroke. The position of the head upon the valve stem 17, and, therefore, the tension of the spring 19, may be readily adjusted by means of a suitable nut 20 at the outer end of the valve stem. The exhaust valve 21 is similar in construction to the inlet valve 14, and is carried by a valve stem 22 extending out through the outer wall of the cylinder head. The exhaust port communicates with an exhaust passage 23 in the cylinder head. The cylinder is provided with an auxiliary exhaust port 24, so disposed as to be uncovered by the piston at the end of the explosion stroke, and this port communicates with a by-pass 25 leading to the exhaust passage 23 adjacent the main exhaust valve 21.

Mounted upon the cylinder head is a valve casing 26 having a valve seat for a valve 27 mounted upon the valve stem 22 of the main exhaust valve. The valve 27 is preferably larger than the valve 21, and as both are rigidly connected to the same valve stem, it is evident that they operate simultaneously. The valve seats are so disposed that the two valves are seated at the same time, and the passages are so constructed that the exhaust gases except such as escape through passage 25 in order to escape from the engine must pass the two valves in succession. The chamber in the valve casing 26 communicates by a passage 28 with the exhaust passage 23 of the cylinder head, and the chamber 29 below the valve 27, that is, upon the exhaust side thereof, communicates with a port 30 leading to the outside atmosphere, or, if desired, to a muffler. The outer end of the valve stem 22 is provided with an enlarged head 31 having a passage therethrough and forming a yoke for purposes hereinafter set forth. The head is provided with a flange forming a seat for a coil spring 32, which normally tends to hold the valves 21 and 27 in their closed positions. In the operation of this portion of my invention, the piston at the end of the explosion stroke uncovers the port 24 and permits the exhaust gases to flow through the by-pass 25 into the passage 23 and the passage 28. The gases in the passage 23 neutralize the pressure against the valve 21, that is, render the pressure upon the opposite sides thereof identically the same, and the exhaust gases within the passage 28 act upon the valve 27 and in opposition to the spring 32 to open this valve and also the valve 21 operatively connected thereto. The gases then escape from the engine past the valves 21 and 27 in succession. As the piston closes the auxiliary exhaust port 24, the position of the valves is in no way affected, as so long as the valve 21 remains open the flow of the exhaust gases against the valve 27 on their way to the port 30, holds the valve 27 open, and, therefore, holds open the valve 21. At the end of the exhaust stroke when the piston starts upon the suction stroke, the pressure against the valve 27 being relieved, the spring 32 closes this valve, as well as the valve 21. The suction pressure causes the inlet valve 14 to open in the usual manner and a new charge is taken in, then compressed and ignited in the usual manner by any suitable igniter 13ᵃ. At the time of the explosion, the valve 21 cannot open as the pressure upon the opposite side of the valve 27 is the same, and the entire pressure exerted upon the valve 21 tends to close the same. Thus, the valves operate entirely automatically and the several valves are automatically held open for the desired length of time.

For positively controlling the valves and in order to regulate the speed of the engine, I provide means controllable by a governor for positively holding the inlet valve closed and positively holding the exhaust valve open, so that no new fuel charge can enter the cylinder when the speed of the engine exceeds a predetermined limit. For accomplishing this, I provide a lever arm 33 having one end thereof pivoted to a stationary portion of the engine and extending into engagement with the end 31 of the valve stem of the exhaust valve, the lever arm being provided with a branch arm 34 forming a catch for holding the inlet valve closed and having a portion thereof adapted to be engaged by a separate catch, the position of which is determined by the speed of the engine.

As illustrated, the cylinder head is provided with a cylindrical casing 35 inclosing the outer end of the inlet valve stem, and provided with one or more outwardly-extending lugs or ears to which is pivotally connected the lever arm 33. The casing is provided with a slot in one side thereof, and the head 18 of the inlet valve stem is provided with a lug 36 extending out through this slot. The branch arm or catch 34 of the lever arm 33 is so constructed that by the movement of the lever arm 33, the end of the catch may be brought into or out of the slot and thus by coöperating with the lug 36, permit or prevent the opening of the inlet valve by suction pressure. The head 31 of the exhaust valve stem is provided with an opening through which extends the lever arm, and the upper and lower walls of the opening are so constructed as to permit a rocking or tilting, as well as a slight sliding motion, of the lever arm in respect to the head. The lever arm extends a slight distance beyond the head 31, and the free end is so constructed that it may be engaged by a pivoted catch to positively hold the lever arm in its lowered position. This catch preferably comprises a bell crank lever 38 having a shoulder 39, beneath which the end 37 of the lever arm may engage, and having a horizontally extending portion 40 by which the bell crank lever may be operated. The lower surface of the end 37 and the portion of the bell crank lever above the shoulder 39 are beveled so that the parts may slide past each other while traveling in one direction, but be prevented from return movement.

The engine is provided with any suitable form of centrifugal governor operatively connected to a controlling rod 41 and serving to move the rod longitudinally by variations in the speed of the engine. The rod 41 is operatively connected to the bell crank lever 38 to operate the latter, and this connection preferably includes a lost motion construction. As shown, the rod 41 is screw-threaded to a hollow sleeve 42, into which extends the end of a rod 43 held in alinement with the rod 41 and pivotally connected to the outer end of the bell crank lever. Surrounding the rod 43 and having one end in engagement with the sleeve 42 and the other end in engagement with a flange or shoulder on the rod 43, I provide a coil spring 44 normally holding the parts in the position indicated in the drawings. For moving the rod 41 longitudinally and controlling the position thereof in accordance with the speed of the engine, any suitable governor may be employed. In Fig. 3 I have illustrated one form in which there are provided pivoted arms 45 mounted within a fly wheel 46 and having balls or weights 47 at the outer ends thereof. The balls are normally drawn toward the crank shaft 48 by the action of a suitable spring 49. Mounted upon the crank shaft, intermediate the crank case and the fly wheel, is a sliding collar 50 having two annular grooves therein, one of the grooves serving for the reception of the inner end of the arms 45, and the other serving for the reception of the end of a bell crank lever 51 pivoted to the crank case and to the rod 41. As the speed of the engine increases, the arms 45 are thrown outward and the collar 50 drawn toward the fly wheel. The movement of the collar causes a movement of the bell crank lever 51 and an upward movement of the rod 41. In the operation of this portion of my invention, the rod 41 is moved longitudinally by variations in the speed of the engine, and when the speed exceeds a predetermined limit, the rod 41 is moved upward to such an extend that the shoulder 39 of the bell crank lever is brought into the path of movement of the end 37 of the lever arm. If at the time that the shoulder 39 is moved laterally a suitable distance to interfere with the operation of the lever arm the latter happens to be above the shoulder, it may slide past the shoulder due to the cam action of the engaging parts and the compression of the spring 44. With the end of the lever 33 below the shoulder, the return movement is positively prevented and the inlet valve is, therefore, positively held in its open position. The catch 34 engages below the lug 36 and positively holds the inlet valve from opening. With the parts in this position, the admission of a fresh fuel charge is positively prevented and the movement of the piston merely serves to draw in and force out non-explosive gas through the exhaust valve. As soon as the speed decreases below a predetermined limit, the rod 41 is lowered and the shoulder 39 brought out of engagement with the lever arm, and the free movement of the latter, as well as the inlet and exhaust valves, is permitted.

By constructing an engine as above described, I eliminate all gears, pinions, rollers, cams, &c., for operating the valves and permit them to be operated solely by pressure. The valves are thus entirely automatic in their operation, and as their operation depends upon pressure, it is evident that the engine may be operated equally well in either direction. The engine is automatically controlled by controlling the operation of the valves, and no fuel charge is wasted when the governor operates to reduce the speed. When the governor operates to reduce the speed, the engine draws in and exhausts freely through the exhaust port, and it is impossible for the formation of any excessive pressure or any partial vacuum to unduly retard the speed. The cold air taken in through the exhaust port helps to cool the engine, thus aiding the water jacket in the performance of its function.

Having thus described my invention, I claim as new and desire to secure by Letters Patent:

1. In an engine, a cylinder having an inlet valve, a valve stem carried thereby and extending to the exterior of the cylinder, a casing inclosing the outer end of said valve stem and having an opening in the side thereof, a lever pivoted to said casing and having a portion thereof adapted to enter said opening to engage with said valve stem, an exhaust valve, a valve stem therefor, and engaging with said lever to intermittently move it into and out of engagement with said inlet valve stem, and means adapted to engage with said lever to cause the latter to lock the inlet valve in its closed position when the engine exceeds a predetermined speed.

2. In an engine, a cylinder having a spring-pressed inwardly-opening inlet valve, a spring-pressed inwardly-opening exhaust valve, valve stems for each of said valves extending to the exterior of said cylinder, a casing inclosing the outer end of one of said valve stems and having an opening in the side thereof, a lever pivoted to said casing and having portions thereof adapted to engage with both of said valve stems, and locking mechanism for engaging with said lever to hold the inlet valve closed and the exhaust valve open when the engine exceeds a predetermined speed.

3. In an engine, a cylinder having an inlet valve, an inwardly-opening exhaust valve, a valve stem for said exhaust valve and extending exteriorly of said cylinder, a spring for normally closing said exhaust valve, a pivoted lever having one end thereof in engagement with said valve stem, a bell crank lever having one end thereof adapted to engage with said lever to lock the exhaust valve in its open position, centrifugal governor mechanism, and an extensible rod connecting said governor mechanism and the other end of said bell crank lever and comprising two telescoping sections, and a spring for resisting the telescoping movement.

In testimony whereof I have signed my name to this specification in the presence of two subscribing witnesses.

WILLIAM L. WAYRYNEN.

Witnesses:
E. A. RUDEN,
WM. B. RUMANN.